United States Patent
Carofiglio et al.

(10) Patent No.: US 11,665,261 B1
(45) Date of Patent: May 30, 2023

(54) REPORTING PATH MEASUREMENTS FOR APPLICATION QUALITY OF EXPERIENCE PREDICTION USING AN INTEREST METRIC

(71) Applicant: Cisco Technology, Inc., San Jose, CA (US)

(72) Inventors: Giovanna Carofiglio, Paris (FR); Jordan François Jean Augé, Saint-Cyr-l-Ecole (FR); Enrico Loparco, Issy-les-Moulineaux (FR); Luca Muscariello, Paris (FR)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/696,991

(22) Filed: Mar. 17, 2022

(51) Int. Cl.
*H04L 67/75* (2022.01)
*H04L 41/5009* (2022.01)
*H04L 43/0823* (2022.01)
*H04L 43/0817* (2022.01)

(52) U.S. Cl.
CPC .......... *H04L 67/75* (2022.05); *H04L 41/5009* (2013.01); *H04L 43/0817* (2013.01); *H04L 43/0823* (2013.01)

(58) Field of Classification Search
CPC ............. H04L 41/5009; H04L 41/5032; H04L 41/147; H04L 41/5067
See application file for complete search history.

(56) References Cited

U.S. PATENT DOCUMENTS

| | | |
|---|---|---|
| 2019/0312791 A1 | 10/2019 | Ligata et al. |
| 2020/0351173 A1 | 11/2020 | Vasseur et al. |
| 2021/0176530 A1 | 6/2021 | Lobanov et al. |

FOREIGN PATENT DOCUMENTS

| | | |
|---|---|---|
| WO | 2015/144211 | 10/2015 |
| WO | 2019/101193 | 5/2019 |
| WO | 2021/048742 | 3/2021 |

OTHER PUBLICATIONS

Lim, et al., "3LC: Lightweight and Effective Traffic Compression for Distributed Machine Learning", online: https://mlsys.org/Conferences/2019/doc/2019/32.pdf, Proceedings of the 2nd SysML Conference, 2019, 12 pages, Palo Alto, CA, USA.
"Azure Stream Analytics", online: https://azure.microsoft.com/en-us/services/stream-analytics/#overview, accessed Mar. 4, 2022, 5 pages, Microsoft.

*Primary Examiner* — Joe Chacko
(74) *Attorney, Agent, or Firm* — Behmke Innovation Group LLC; James M. Behmke; Jonathon P. Western

(57) ABSTRACT

In one embodiment, a device determines a first difference between current path measurements and prior path measurements. The device determines a second difference between current predictions and prior predictions made by a prediction model based on path measurements. The device computes, based on the first difference and the second difference, an interest metric for the current path measurements. The device sends at least a portion of the current path measurements for input to the prediction model, when the interest metric exceeds a predefined threshold.

20 Claims, 8 Drawing Sheets

REPORTING PATH MEASUREMENTS FOR APPLICATION QUALITY OF EXPERIENCE PREDICTION USING AN INTEREST METRIC

TECHNICAL FIELD

The present disclosure relates generally to computer networks, and, more particularly, to reporting path measurements for application Quality of Experience (QoE) prediction using an interest metric.

BACKGROUND

Software tools have been increasingly configured to monitor and report analytics (or metrics) comprising various types of data. In most cases, reporting of such information at small timescales imply generation and communication of voluminous amounts of data across networks. Current approaches decide, a priori, how much and what data is reported (i.e., moved, sent, etc.) across networks based on local device resources (e.g., storage, memory, CPU usage, bandwidth, etc.). Typically, the reported metrics are used as training data for various kinds of prediction models (e.g., statistical learning, deep learning, etc.) in a wide range of applications.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
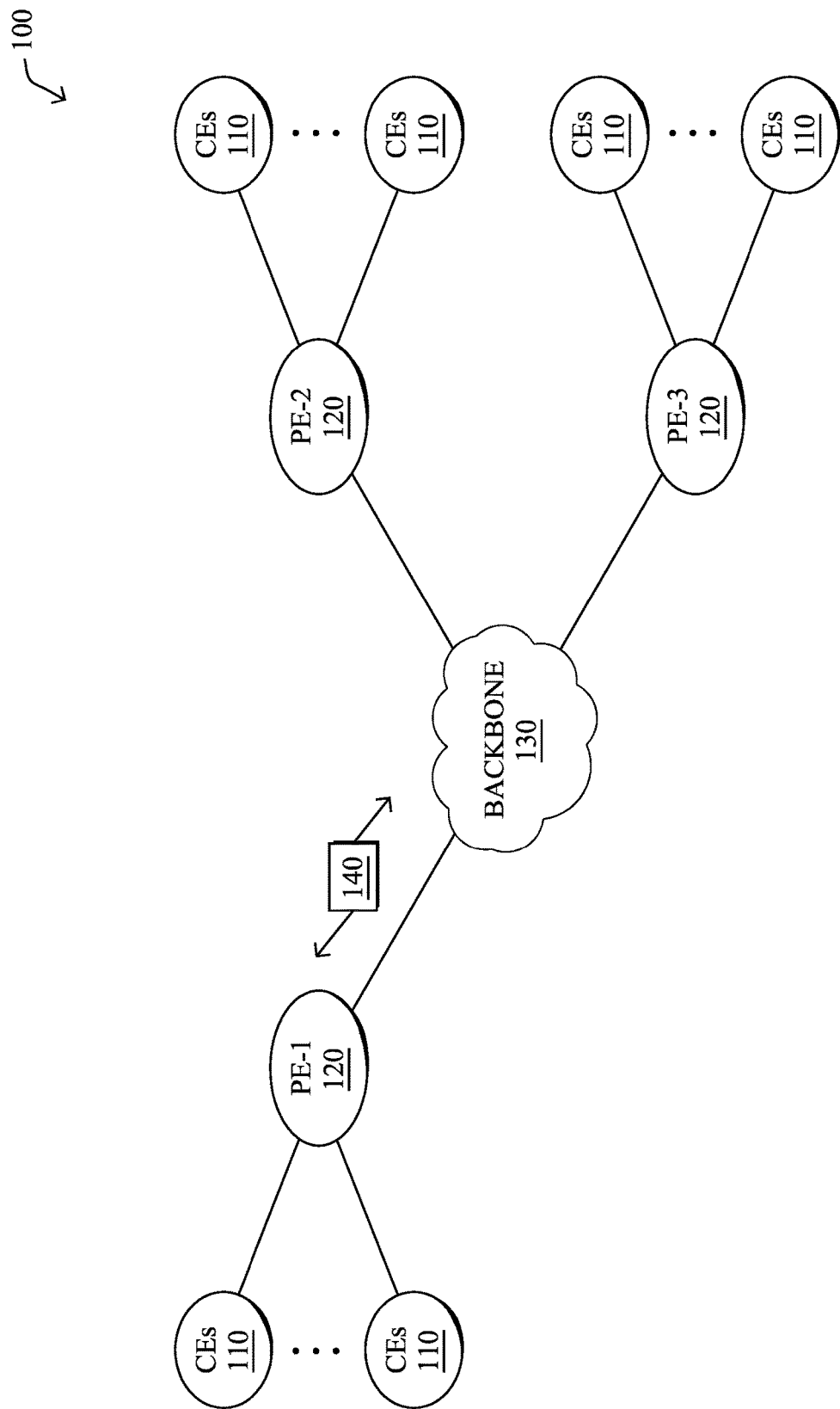
FIGS. 1A-1B illustrate an example communication network.

According to one or more embodiments of the disclosure, a device determines a first difference between current path measurements and prior path measurements. The device determines a second difference between current predictions and prior predictions made by a prediction model based on path measurements. The device computes, based on the first difference and the second difference, an interest metric for the current path measurements. The device sends at least a portion of the current path measurements for input to the prediction model, when the interest metric exceeds a predefined threshold.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
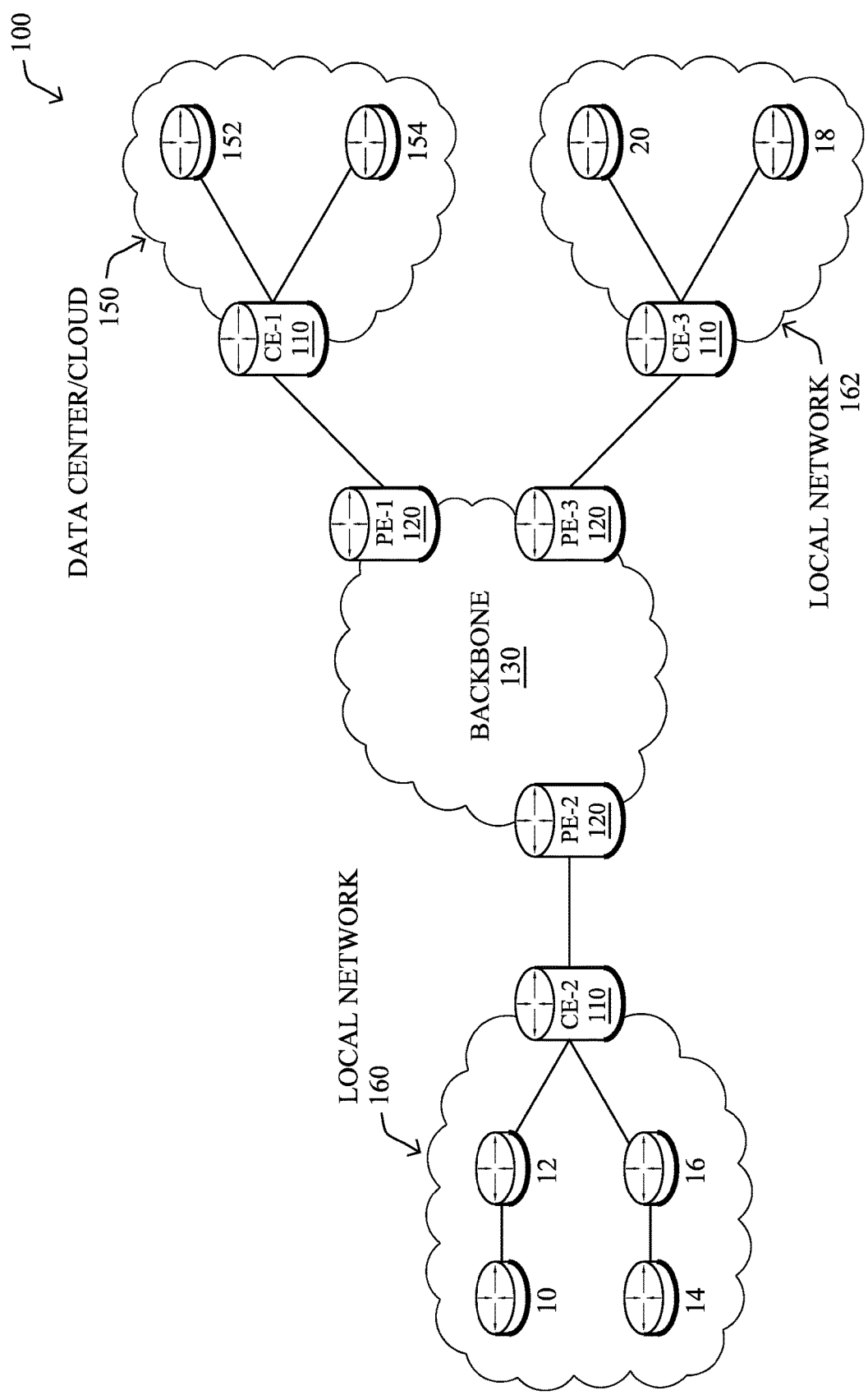

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
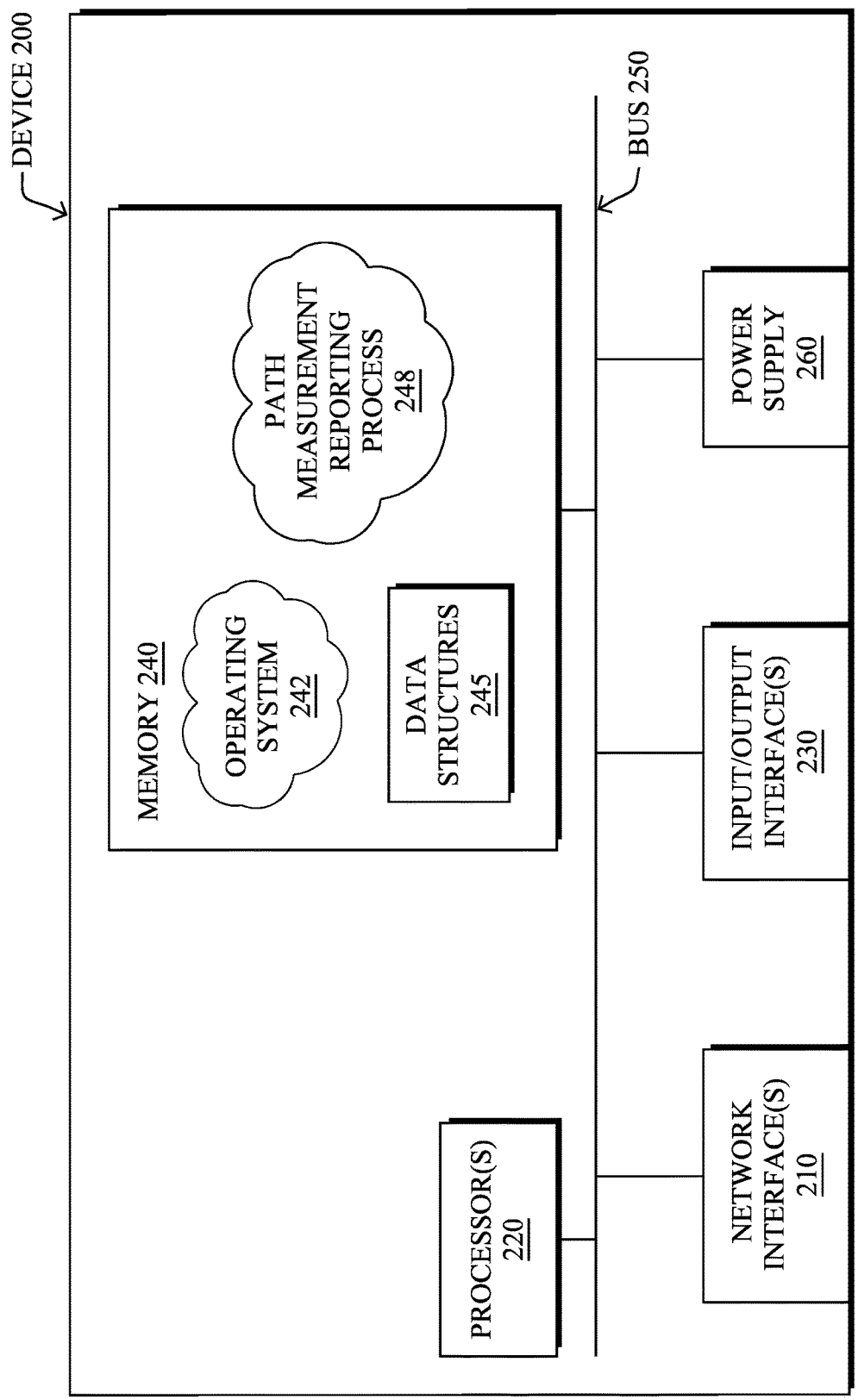
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, physical network interfaces 210 may also be used to implement one or more virtual network interfaces, such as for virtual private network (VPN) access, known to those skilled in the art. As is understood in the art, network interfaces 210 may comprise a plurality of network interfaces used for a variety of networking communication protocols, for example, Wi-Fi, cellular (LTE, 5G, etc.), Bluetooth, etc.

Depending on the type of device, other interfaces, such as input/output (I/O) interfaces 230, user interfaces (UIs), and so on, may also be present on the device. Input devices, in particular, may include an alpha-numeric keypad (e.g., a keyboard) for inputting alpha-numeric and other information, a pointing device (e.g., a mouse, a trackball, stylus, or cursor direction keys), a touchscreen, a microphone, a camera, and so on. Additionally, output devices may include speakers, printers, particular network interfaces, monitors, etc.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise path measurement reporting process 248, as described herein, any of which may alternatively be located within individual network interfaces.

Path measurement reporting process 248 may also include computer executable instructions that, when executed by processor(s) 220, cause device 200 to predict one or more metrics (e.g., Quality of Service type, Quality of Experience type, etc.), thereby allowing device 200 to proactively reroute traffic to avoid situations, circumstances, etc. that are likely given a set of observed measurements in a given network. To do so, in some embodiments, path measurement reporting process 248 may utilize machine learning. In general, machine learning is concerned with the design and the development of techniques that take as input empirical data (such as network statistics and performance indicators) and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that M=a*x+ b*y+c, and the cost function would be the number of misclassified points. The learning process then operates by adjusting the parameters a, b, c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, path measurement reporting process 248 may employ one or more supervised, unsupervised, or semi-supervised machine learning models. Generally, supervised learning entails the use of a training set of data, as noted above, that is used to train the model to apply labels to the input data. For example, the training data may include sample network telemetry that has been labeled as indicative of a network element failure, such as failure of a link or node/device, or indicative of normal operation. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior. Semi-supervised learning models take a middle ground approach that uses a greatly reduced set of labeled training data.

Example machine learning techniques that path measurement reporting process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of times the model incorrectly predicted that a network element will fail. Conversely, the false negatives of the model may refer to the number of times the model predicted normal network element operations, when the network element actually fails. True negatives and positives may refer to the number of times the model correctly predicted whether a network element will perform normally or will fail, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Generally, a given mobile device (e.g., cellphone, tablet, laptop, etc.) may send out a plurality of packet (or network) flows from a plurality of different applications that execute on the device. These flows travel a network path from the device through a plurality of networking devices (e.g., routers, switches, telecommunications hardware, etc.) to a destination, where the destination may perform an action, return information/data, etc. Conventionally, measuring the performance of network paths is done in terms of Quality of Service (QoS), which may be understood as a collection of measurements, which from time-to-time be referred to as path measurements, that indicate how well a given network path is performing at a networking device level. These measurements may include packet loss, bit rate, throughput, transmission delay, availability, jitter, etc. However, QoS measurements and optimizations based on them might not directly correlate to an increase in end-user quality expectations for a given application (i.e., Quality of Experience (QoE)). That is, QoE may be understood as referring to the subjective assessment of an application experience from the standpoint of a user of the application. QoE may be measured within the application itself, for example, using intra-application ratings of an application (e.g., a session of videoconference application may be rated from zero to five). In another example, QoE of a given application executing on a device may be measure by another application of the device. QoE may also be measured using a side channel such as satisfaction surveys via email, text message, etc. In the aggregate, QoE-type ratings may be indicated by a mean opinion score.

Traditionally, QoS has been used as a proxy for QoE. For example, QoS measurements may be compared to one or more service level agreements (SLAs), where a given SLA, as is understood in the art, may include a plurality of minimum requirements for a measured network quality metric, guarantees of service, etc. When using QoS as a proxy for QoE, for example, QoS measurements may be compared to an SLA and, if requirements of the SLA are met, then it is assumed that an end user's experience of the application is "good." However, it has become increasingly evident that there are many scenarios where QoS analysis of network paths does not map to QoE assessments of a user's experience. For example, QoS metrics for a web browser application on a device may indicate that that the application is not meeting SLA requirements, but an end user's subjective experience, in terms of QoE, may still be "good." On the other hand, there are cases, where QoS metrics for a videoconference application, real-time communication application, etc. indicate that the application is meeting SLA requirements, but an end user's QoE of the application may be "bad."

As noted above, software tools have been increasingly configured to monitor and report analytics or metrics comprising various types of data, even in very fine grade timescales (e.g., on the order of milliseconds). In most cases, reporting of data at timescales like these imply or are hand-in-hand with generation and communication of voluminous amounts of data across networks. That is, the requirements to move and store the data increase significantly, sometimes to the point where the reporting and analysis of the metrics become unwieldy. Current approaches decide, a priori, how much and what data is reported (i.e., moved, sent, etc.) across networks based on local device resources (e.g., storage, memory, CPU usage, bandwidth, etc.). Additional filtering decisions may be made by other devices/entities after the reported data has been sent from a reporting device. Typically, the reported metrics are used as training data for various kinds of prediction models (e.g., statistical learning, deep learning, etc.) in a wide range of applications. For example, a prediction model may be used to predict one or more QoE metrics for a real-time communication system. Conventional prediction models for QoE generally, however, do not determine how much and which data is actually moved across a given communications network based on the impact to the performance of the prediction model.

Reporting Path Measurements for Application Quality of Experience (QoE) Prediction Using an Interest Metric The techniques herein introduce mechanisms for reporting path measurements for application Quality of Experience (QoE) prediction using an interest metric. Generally, to minimize network usage in terms of reducing the volume of data (e.g., performance metrics) that is sent, stored, and processed for QoE predictions, the techniques herein ensure that devices only report network metrics when the metrics would improve machine learning-based QoE prediction models. That is, data that is sent from one location (e.g., an endpoint device) to another location is data that provides measurable advantages in terms of maximizing effectiveness of QoE metric predictions (e.g., as input to one or more machine learning models). Doing so limits waste of network resources by avoiding the transmission of data across the Internet that has little or no influence on the effectiveness of a given QoE metric prediction machine learning model.

The techniques herein, then, configure an endpoint device (or any other device) that gathers information for input to a QoE prediction model by applying a set of heuristics focused on variation, sampling, and utility to determine whether information should be sent and used. Variation is directed to whether a network metric is "new" relatively to previously reported metrics. Sampling is directed to whether a prediction based on a given metric is not in a highly sampled area (for a given machine learning model model). Lastly, utility relates to end-user configurations/weightings used to vary importance of different types of metrics. In other words, performance of given QoE prediction model may be strictly coupled to selection of data (e.g., QoS-based metrics) to be sent and used as input for the QoE prediction model.

Specifically, according to various embodiments, a device determines a first difference between current path measurements and prior path measurements. The device determines a second difference between current predictions and prior predictions made by a prediction model based on path measurements. The device computes, based on the first difference and the second difference, an interest metric for the current path measurements. The device sends at least a portion of the current path measurements for input to the prediction model, when the interest metric exceeds a predefined threshold.

Illustratively, the techniques described herein may be performed by hardware, software, and/or firmware, such as in accordance with path measurement reporting process 248, which may include computer executable instructions executed by the processor 220 (or independent processor of interfaces 210) to perform functions relating to the techniques described herein.

Figure 3:
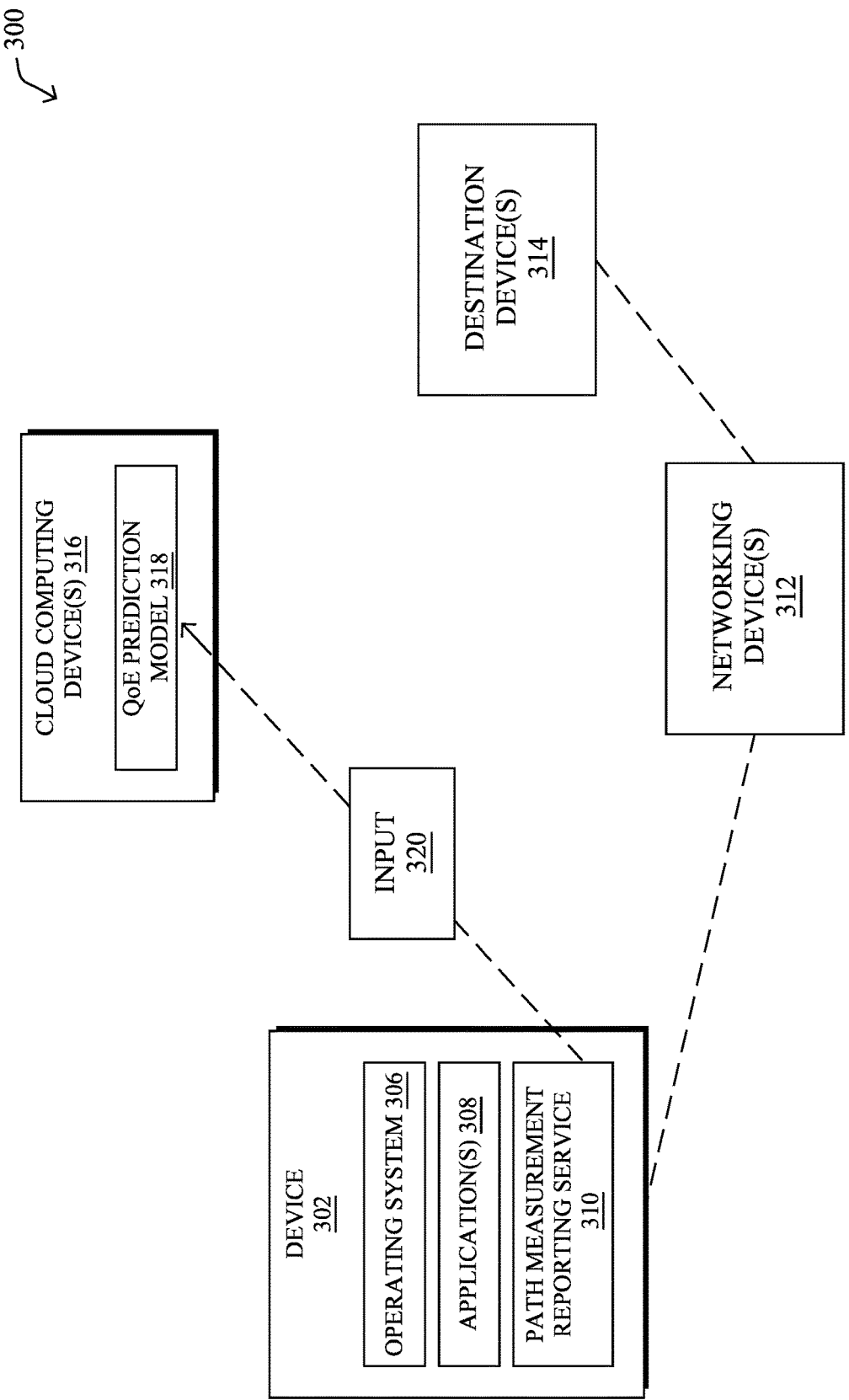
FIG. 3 illustrates an example architecture for reporting path measurements for application Quality of Experience (QoE) prediction using an interest metric.

Operationally, FIG. 3 illustrates an example architecture for reporting path measurements for application QoE prediction using an interest metric, where architecture 300 may include an endpoint device 302 and a destination device 304. Endpoint device 302 may comprise any end user computing device which a user may use to communicate with destination device 304, for example, a cellphone, tablet, laptop, cellphone, etc. Endpoint device 302, as shown, may comprise operating system 306, application(s) 308, and path measurement reporting service 310 that is local to endpoint device 302. Of note, operating system 306 may be configured as described above with respect to operating system 242 of FIG. 2, where operating system 306 may manage network communications, input/output, etc. of endpoint device 302. Application(s) 308 of endpoint device 302 may comprise applications that may be executed on endpoint device 302 (along with operating system 306), for example, a real-time communication (RTC) application, a videoconference application, a multimedia application, a gaming application, etc. that communicate one or more network flows which travel over paths comprising networking device(s) 312 to destination device(s) 314. Generally, path measurement reporting service 310 may comprise components, hardware, software, etc. that are used to implement path measurement reporting process 248.

In addition, destination device(s) 314 may comprise computing resources, data storage, etc. that application(s) 308 may access or use during execution. In addition, architecture 300 comprises cloud computing device(s) 316 that, as shown in FIG. 3, is configured to train, store, process, etc. a QoE prediction model 318, which may be based on one or more of the machine learning techniques described herein. Generally, QoE prediction model 318 may be used to predict performance of application(s) 308 in terms of an end user subjective experience. As will be described in greater detail herein, path measurement reporting service 310 may be configured to gather, monitor, etc. one or more path measurement statistics, information, etc. (e.g., regarding network resource performance from endpoint device 302 to destination device 304) then select which of the path measurements to be sent as input 320 for QoE prediction model 318.

In particular, regarding operation of path measurement reporting service 310, it may be configured to monitor and ascertain a plurality of Quality of Service (QoS) type metrics in the execution of application(s) 308. Such path measurements include, but are not limited to, bit rate, forward error correction rate, packet loss, jitter, inter-arrival time, throughput, transmission delay, availability, etc. Reporting the entirety of this path measurement information conventionally is unwieldly, and, instead, path measurement reporting service 310 is configured to reduce a frequency at which path measurement information sent towards a device which may execute a machine learning model to predict QoE performance (e.g., cloud computing device(s) 316). In doing so, path measurement reporting service 310 may be configured to determine one or more differences between currently observed path measurement information and previously reported/observed path measurement information in terms of a set of heuristics, including:
  a) variation which is indicative of whether a network metric (or a path measurement) is "new" relatively to previously reported metrics;
  b) sampling which is indicative of density of an already sampled area in a multidimensional QoS and/or QoE space (of a given prediction model, e.g., QoE prediction model 318) (As will be understood to one having ordinary skill in the art, a highly sampled area generally indicates that an accurate enough model for that input range is already present); and
  c) utility which is indicative of actionability of a given network metric or, in other words, if it will actually be used when training a given machine learning model. (There are instances, for example, when a given input would be discarded in training of a given machine learning model.)

Path measurement reporting service 310 may be configured to periodically determine whether a current set of path measurement metrics (e.g., every t seconds) satisfies the aforementioned heuristics. That is, for variation, it may determine whether a current set of QoS-type metrics are different enough from previous time bins (e.g., in a particular increment, in aggregate, etc.) using a distance measure. Further, for sampling, the path measurement reporting service 310 may determine whether QoE predictions (e.g., made using an offline generated model) is not in a highly sampled area with respect to a current model data space (which can be based on some distance measure). For each of these heuristics, a difference may be calculated (e.g., between current and prior path measurements, current and prior predictions, etc.).

Further, path measurement reporting service 310 may be configured to define and implement an interest metric that quantifies a value of a given current path measurement and the necessity to export or send it for offline analysis/learning as a linear combination of the factors above (variation, sampling, and utility). Specifically, the interest metric can be calculated as interest=$a*d_t+b\ d_e$, where $d_t$ and $d_e$ are respectively the distance with respect to the current session (variation) and the model (sampling); and a and b are coefficients to be tuned (e.g., weightings). A threshold of interest may be implemented that is used to decide whether path measurement reporting service 310 sends a path measurement or not.

In addition, with respect to the utility heuristics, path measurement reporting service 310 may be configured to determine whether a given path measurement is a type of metric that is useful or not useful in training or construction of an accurate QoE prediction model. For instance, packet length may be highly correlated with inter-arrival time and bit rate, and therefore redundant for construction of a model. These metrics may be detected offline while training the model, for example, using techniques like feature selection, correlation, feature importance, etc. Based on these determination(s), path measurement reporting service 310 may be configured to only report path measurements that are "useful" (e.g., via a list of QoS metrics that are requested). It is contemplated that path measurement reporting service 310 may be dynamically configured to at different times report different types of metrics, thereby providing high flexibility since features initially discarded may later be added (or vice versa).

Upon determining that a given set of current path measurements satisfy the heuristics, path measurement reporting service 310 may send them as inputs for QoE prediction model 318, where it may be retrained and/or updated with the sent path measurements (to improve or update the model's accuracy). It is contemplated that individual metric measurements may be sent. Alternatively, they may be sent in the form of aggregate statistics (e.g., mean, variance, etc.) over a given measured time period.

Figure 4A:
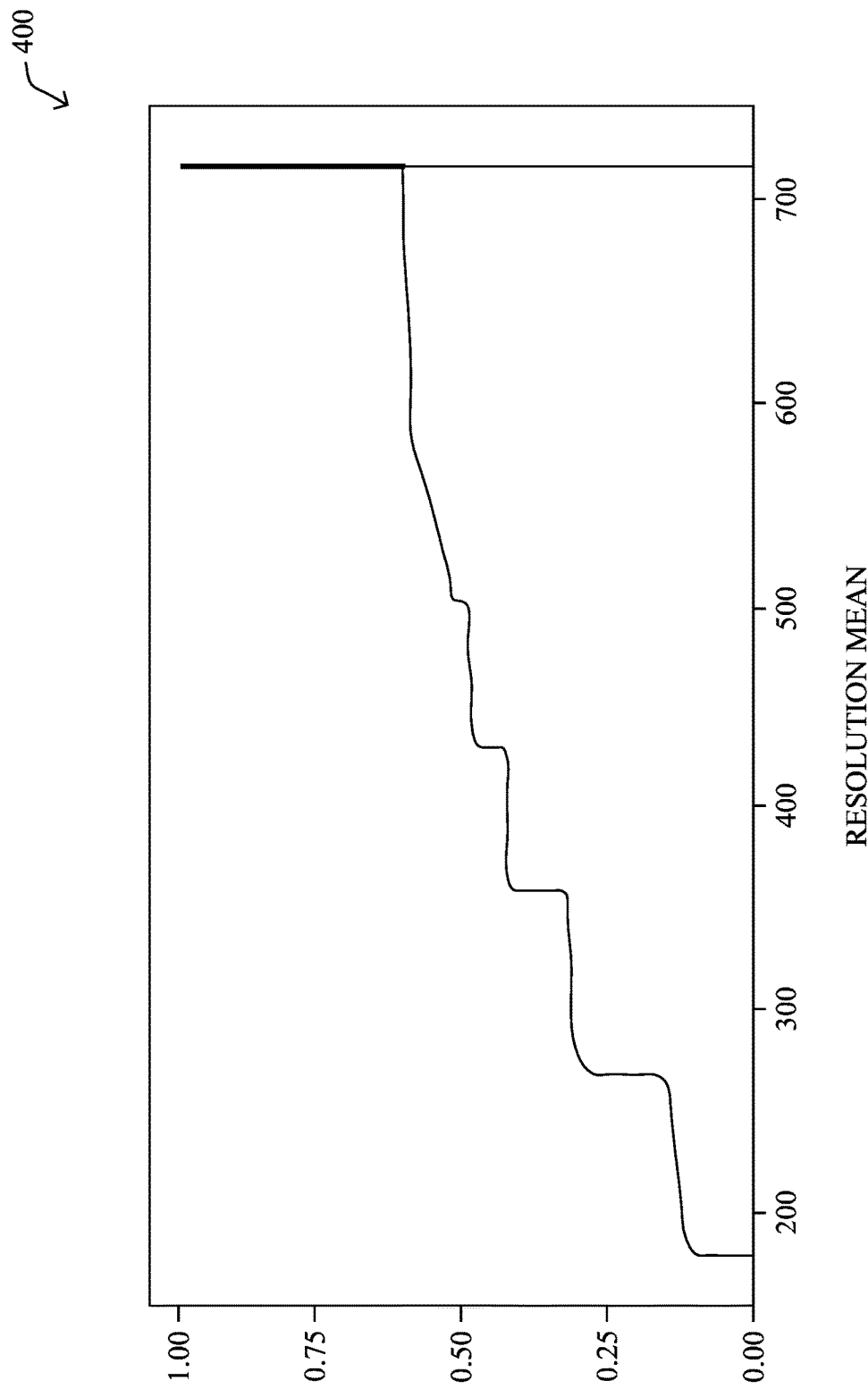
FIGS. 4A-4C illustrate examples of QoE model predictions.
Figure 4B:
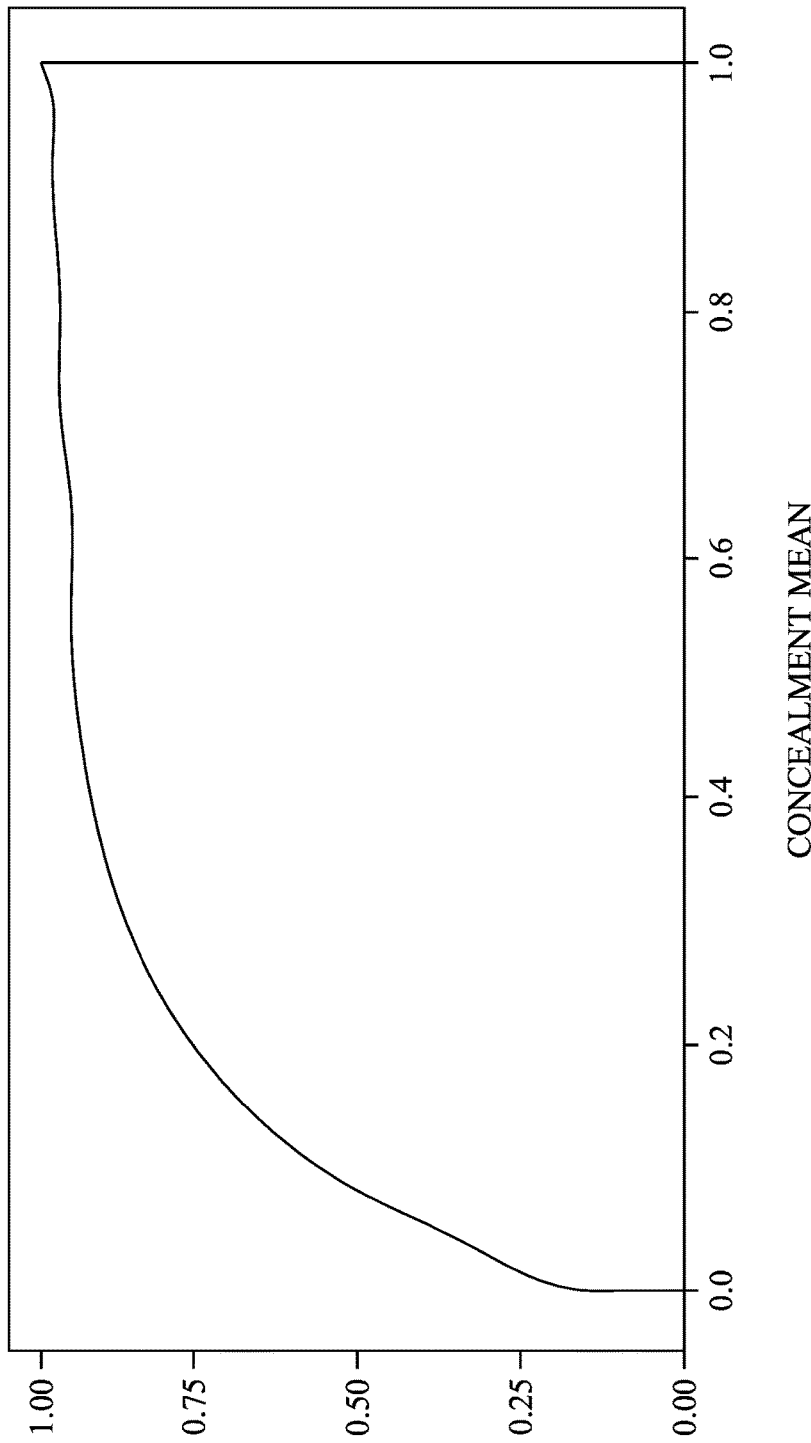
Figure 4C:
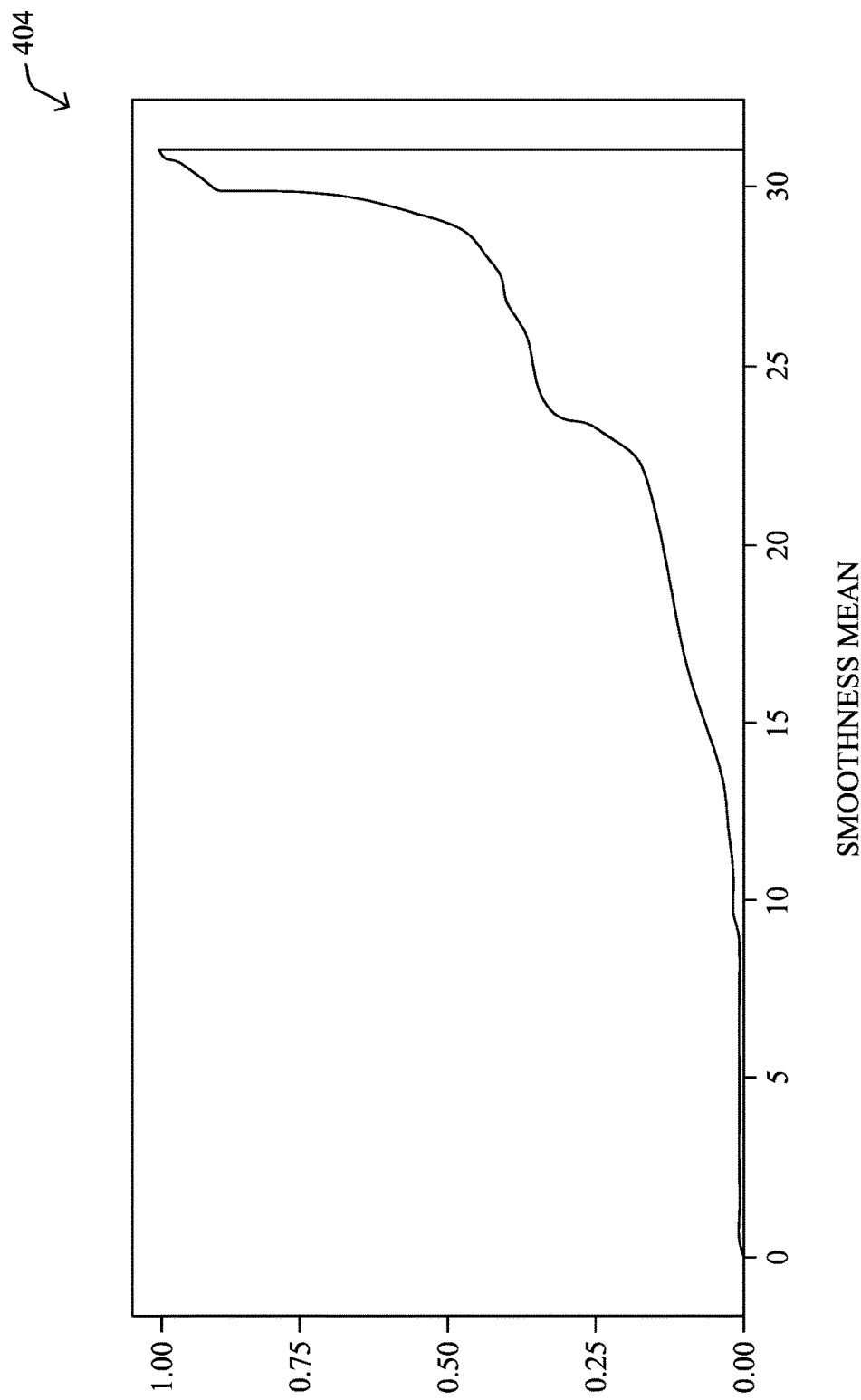

Turning to FIGS. 4A-4C, example illustrations of QoE model predictions are shown. In FIG. 4A, QoE model outputs 400 are predicted are shown in terms of resolution (e.g., a video quality) for a real-time communication (RTC) application. In FIG. 4B, QoE model outputs 402 are predicted are shown in terms of concealment (e.g., a function of the time spent by a decoder to conceal frame errors) for an RTC application. In FIG. 4C, QoE model outputs 404 are predicted are shown in terms of smoothness (e.g., average frame rate) for an RTC application. Skewed data, in other words predominance of certain QoE values, is a frequent issue in RTC scenarios for QoE predictions like those shown in FIGS. 4A-4C. Path measurement reporting service 310 may be configured to resolve non-uniform QoE prediction distributions (e.g., as shown in FIGS. 4A-4C). Of note, high QoE values are in general predominant since they more common to occur. While low-sampled QoE areas negatively impact the quality of an obtained model, additional points in the high sampled areas can be redundant, and path measurement reporting service 310 may control whether redundant points of data are sent. That is, by avoiding the reporting of path measurement metrics that lead to predictions in highly sampled areas, path measurement reporting service 310 may lead to a decrease in a given model's training time.

In one or more embodiments, it is contemplated that path measurement reporting service 310 may implement one or more variations based on the previously described utility heuristic. Of note, a dynamic set of features may be sent according to a level of feature importance. Different models are available, each one using different sets of features and having some ranking for them. In cases of uplink bandwidth limited communications environments, a device may be configured to send only the "most" important features.

Figure 5:
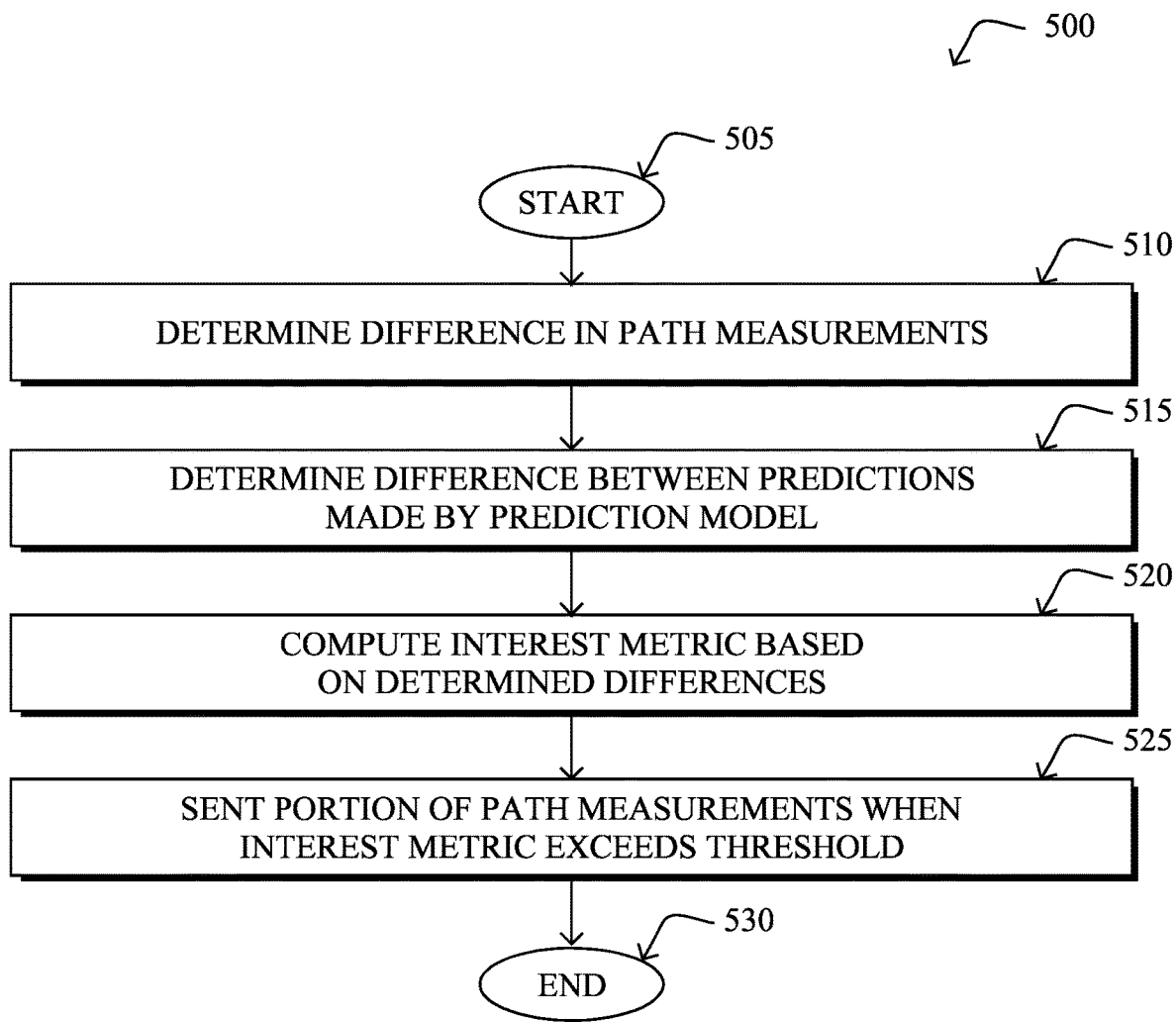
FIG. 5 illustrates an example simplified procedure for reporting path measurements for application QoE prediction using an interest metric.

FIG. 5 illustrates an example simplified procedure (e.g., a method) for reporting path measurements for application Quality of Experience (QoE) prediction using an interest metric, in accordance with one or more embodiments described herein. For example, a non-generic, specifically configured device (e.g., device 200), may perform procedure 500 by executing stored instructions (e.g., path measurement reporting process 248). The procedure 500 may start at step 505, and continues to step 510, where, as described in greater detail above, a device may determine a first difference between current path measurements and prior path measurements. In an embodiment, the current path measurements and the prior path measurements may each comprise at least one of bit rate, forward error correction rate, packet loss, throughput, transmission delay, availability, or jitter. In a further embodiment, the current path measurements and the prior path measurements may comprise statistical measurements. It is contemplated that, in an embodiment, the current path measurements and the prior path measurements may be made for one or more paths over which traffic for a real-time communication application executed by the device is sent.

At step 515, as detailed above, the device may a second difference between current predictions and prior predictions made by a prediction model based on path measurements. In an embodiment, wherein predictions made by the prediction model based on the path measurements may comprise at least one of resolution, concealment, or smoothness. In one or more embodiments, predictions made by the prediction model based on the path measurements may comprise Quality of Experience predictions.

At step 520, the device may compute, based on the first difference and the second difference, an interest metric for the current path measurements. In an embodiment, computing, based on the first difference and the second difference, the interest metric for the current path measurements may comprise applying, by the device, weightings to the first difference and the second difference.

At step 525, as detailed above, the device may send at least a portion of the current path measurements for input to the prediction model, when the interest metric exceeds a predefined threshold. In one or more embodiments, sending at least the portion of the current path measurements for input to the prediction model, when the interest metric exceeds the predefined threshold may comprise selecting, by the device, the current path measurements based on whether the current path measurements are of a type of metric. In an embodiment, the prediction model may be hosted in a cloud computing environment. In a further embodiment, the prediction model may be updated based on the portion of the current path measurements Procedure 500 then ends at step 530.

It should be noted that while certain steps within procedure 500 may be optional as described above, the steps shown in FIG. 5 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, introduce a mechanism for reporting path measurements for application QoE prediction using an interest metric. That is, to minimize network usage in terms of reducing the volume of data (e.g., performance metrics) that is sent, stored, and processed for QoE predictions, the techniques herein ensure that devices only report network metrics when the metrics would improve machine learning-based QoE prediction models. Doing so limits waste of network resources by avoiding the transmission of data across the Internet that has little or no influence on the effectiveness of a given QoE metric prediction model.

While there have been shown and described illustrative embodiments that provide reporting path measurements for application QoE prediction using an interest metric, it is to be understood that various other adaptations and modifications may be made within the spirit and scope of the embodiments herein. For example, while certain embodiments are described herein with respect to using the techniques herein for certain purposes, the techniques herein may be applicable to any number of other use cases, as well. In addition, while certain types of network packets, protocols, etc. are discussed herein, the techniques herein may be used in conjunction with any network packets, protocols, etc.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   determining, at a device, a first difference between current path measurements and prior path measurements;
   determining, by the device, a second difference between current predictions and prior predictions made by a prediction model based on path measurements;
   computing, by the device and based on the first difference and the second difference, an interest metric for the current path measurements; and
   sending, by the device, at least a portion of the current path measurements for input to the prediction model, when the interest metric exceeds a predefined threshold.

2. The method as in claim 1, wherein the prediction model is hosted in a cloud computing environment.

3. The method as in claim 1, wherein the prediction model is updated based on the portion of the current path measurements.

4. The method as in claim 1, wherein predictions made by the prediction model based on the path measurements comprise at least one of resolution, concealment, or smoothness.

5. The method as in claim 1, wherein predictions made by the prediction model based on the path measurements comprise Quality of Experience predictions.

6. The method as in claim 1, wherein computing, based on the first difference and the second difference, the interest metric for the current path measurements comprises:
   applying, by the device, weightings to the first difference and the second difference.

7. The method as in claim 1, wherein sending, by the device, at least the portion of the current path measurements for input to the prediction model, when the interest metric exceeds the predefined threshold comprises:
   selecting, by the device, the current path measurements based on whether the current path measurements are of a type of metric.

8. The method as in claim 1, wherein the current path measurements and the prior path measurements each comprise at least one of bit rate, forward error correction rate, packet loss, throughput, transmission delay, availability, or jitter.

9. The method as in claim 8, wherein the current path measurements and the prior path measurements comprise statistical measurements.

10. The method as in claim 1, wherein the current path measurements and the prior path measurements are made for one or more paths over which traffic for a real-time communication application executed by the device is sent.

11. An apparatus, comprising:
one or more network interfaces to communicate with one or more networks;
a processor coupled to the one or more network interfaces and configured to execute one or more processes; and
a memory configured to store a process that is executable by the processor, the process, when executed, configured to:
determine a first difference between current path measurements and prior path measurements;
determine a second difference between current predictions and prior predictions made by a prediction model based on path measurements;
compute, based on the first difference and the second difference, an interest metric for the current path measurements; and
send at least a portion of the current path measurements for input to the prediction model, when the interest metric exceeds a predefined threshold.

12. The apparatus as in claim 11, wherein the prediction model is hosted in a cloud computing environment.

13. The apparatus as in claim 11, wherein the prediction model is updated based on the portion of the current path measurements.

14. The apparatus as in claim 11, wherein predictions made by the prediction model based on the path measurements comprise at least one of resolution, concealment, or smoothness.

15. The apparatus as in claim 11, wherein predictions made by the prediction model based on the path measurements comprise Quality of Experience predictions.

16. The apparatus as in claim 11, wherein to compute, based on the first difference and the second difference, the interest metric for the current path measurements comprises:
applying weightings to the first difference and the second difference.

17. The apparatus as in claim 11, wherein to send at least the portion of the current path measurements for input to the prediction model, when the interest metric exceeds the predefined threshold comprises:
selecting the current path measurements based on whether the current path measurements are of a type of metric.

18. The apparatus as in claim 11, wherein the current path measurements and the prior path measurements each comprise at least one of bit rate, forward error correction rate, packet loss, throughput, transmission delay, availability, or jitter.

19. The apparatus as in claim 18, wherein the current path measurements and the prior path measurements comprise statistical measurements.

20. A tangible, non-transitory, computer-readable medium storing program instructions that cause a device to execute a process comprising:
determining, at the device, a first difference between current path measurements and prior path measurements;
determining, by the device, a second difference between current predictions and prior predictions made by a prediction model based on path measurements;
computing, by the device and based on the first difference and the second difference, an interest metric for the current path measurements; and
sending, by the device, at least a portion of the current path measurements for input to the prediction model, when the interest metric exceeds a predefined threshold.

* * * * *